US012614672B2

(12) United States Patent
Yanai et al.

(10) Patent No.: US 12,614,672 B2
(45) Date of Patent: Apr. 28, 2026

(54) MULTILAYER CERAMIC ELECTRONIC DEVICE AND MANUFACTURING METHOD OF THE SAME

(71) Applicant: TAIYO YUDEN CO., LTD., Tokyo (JP)

(72) Inventors: Takumu Yanai, Tokyo (JP); Shoji Kusumoto, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 84 days.

(21) Appl. No.: 18/606,467

(22) Filed: Mar. 15, 2024

(65) Prior Publication Data

US 2024/0331942 A1 Oct. 3, 2024

(30) Foreign Application Priority Data

Mar. 31, 2023 (JP) ................................. 2023-059348

(51) Int. Cl.
*H01G 4/224* (2006.01)
*H01G 4/232* (2006.01)
*H01G 4/248* (2006.01)
*H01G 4/30* (2006.01)

(52) U.S. Cl.
CPC ............. *H01G 4/224* (2013.01); *H01G 4/232* (2013.01); *H01G 4/248* (2013.01); *H01G 4/30* (2013.01)

(58) Field of Classification Search
CPC ........ H01G 4/224; H01G 4/232; H01G 4/248; H01G 4/30
See application file for complete search history.

(56) References Cited

U.S. PATENT DOCUMENTS

| | | | | | |
|---|---|---|---|---|---|
| 11,177,071 | B2 * | 11/2021 | Ono | ......................... | H01G 4/224 |
| 2009/0284897 | A1 * | 11/2009 | Itamura | ................... | H01G 4/232 |
| | | | | | 29/25.42 |
| 2012/0229949 | A1 | 9/2012 | Kim | ........................... | 361/321.2 |
| 2012/0229952 | A1 * | 9/2012 | Kim | ........................ | H01G 4/248 |
| | | | | | 29/25.42 |
| 2016/0372255 | A1 * | 12/2016 | Maki | ...................... | H01F 41/041 |
| 2017/0301470 | A1 * | 10/2017 | Asai | ........................ | H01G 4/232 |
| 2017/0301471 | A1 * | 10/2017 | Ono | ........................ | H01G 4/224 |
| 2020/0203074 | A1 | 6/2020 | Ono et al. | ................. | H01G 4/30 |
| 2023/0223199 | A1 * | 7/2023 | Ono | ........................ | H01G 4/232 |
| | | | | | 361/301.4 |

FOREIGN PATENT DOCUMENTS

| | | |
|---|---|---|
| JP | 2012-191159 A | 10/2012 |
| JP | 2020-102479 A | 7/2020 |

* cited by examiner

*Primary Examiner* — Michael P Mcfadden
(74) *Attorney, Agent, or Firm* — Stein IP, LLC

(57) ABSTRACT

A multilayer ceramic electronic device includes a ceramic element body. The active section includes a plurality of internal electrodes stacked in a second direction orthogonal to a first direction. The protection section includes a cover section stacked on the active section along the second direction and a side margin section covering the active section from a third direction orthogonal to the first direction and the second direction. The ridge portion includes a first ridgeline portion on a side of the cover section and a second ridgeline portion on a side of the side margin section, with the recess between the first ridgeline portion and the second ridgeline portion. In a cross section including the second direction and the third direction, a radius of curvature R1 of the first ridgeline portion is larger than a radius of curvature R2 of the second ridgeline portion.

12 Claims, 18 Drawing Sheets

FIG. 6A
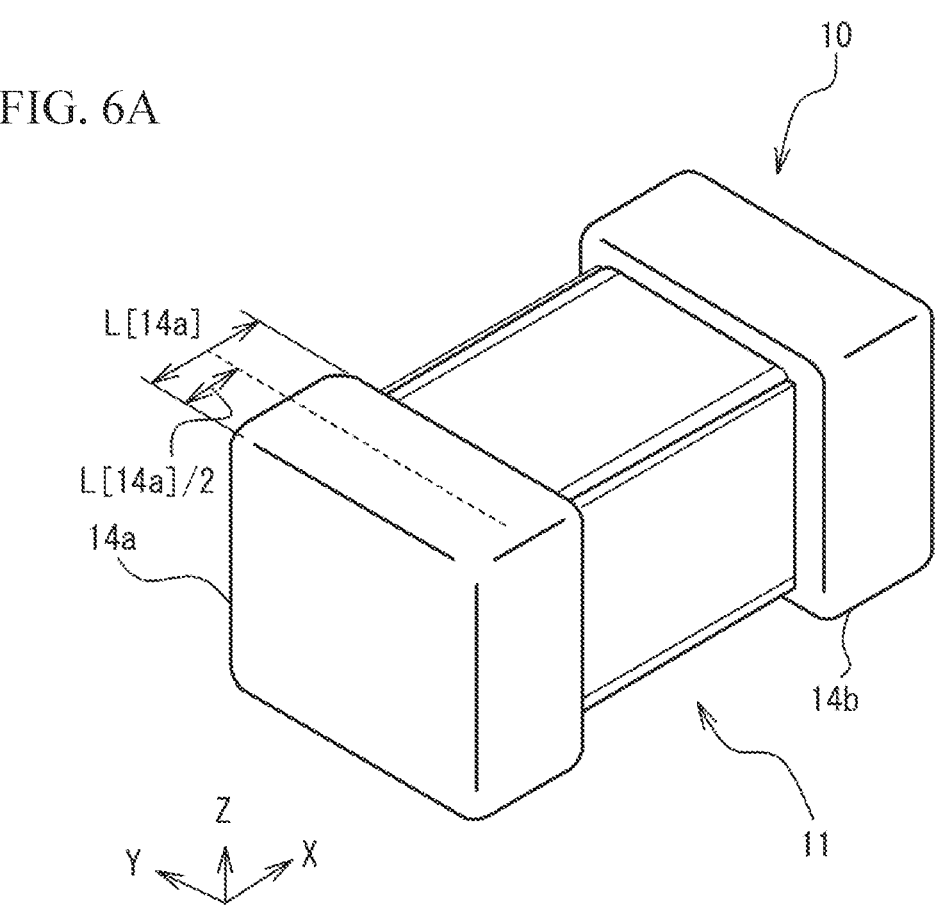
FIG. 6B
FIG. 6C
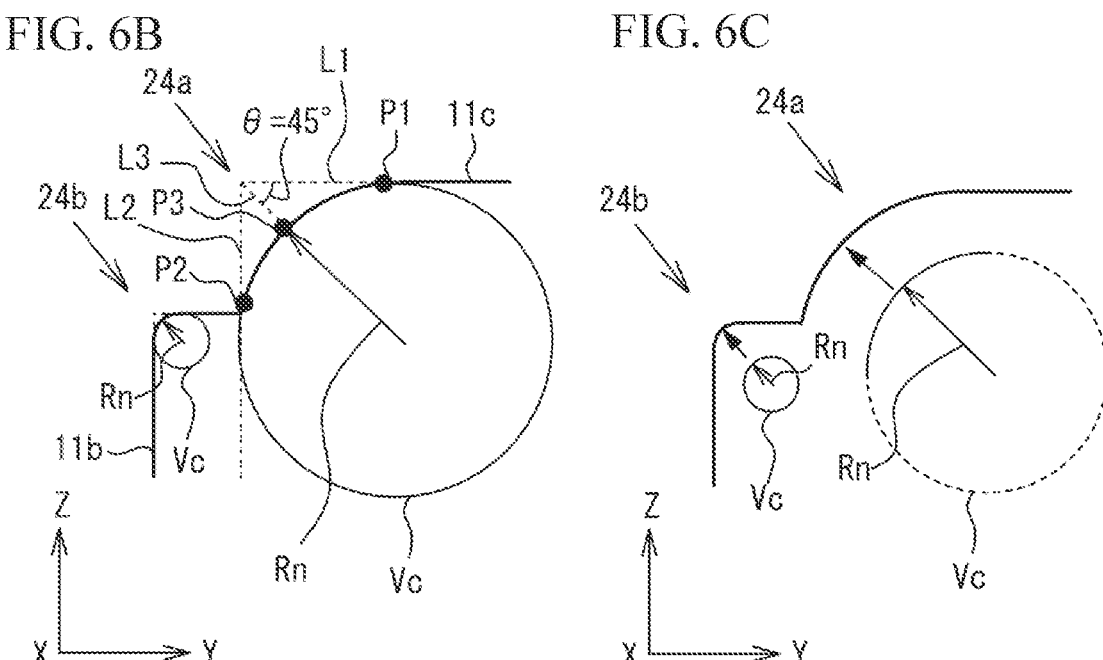

CRACK OCCURRENCE RATE OF
EXAMPLE AND COMPARATIVE EXAMPLE

MULTILAYER CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2023-059348, filed on Mar. 31, 2023, the entire contents of which are incorporated herein by reference.

FIELD

A certain aspect of the present disclosure relates to a multilayer ceramic electronic device and a manufacturing method of the multilayer ceramic electronic device.

BACKGROUND

A multilayer ceramic electronic device such as a multilayer ceramic capacitor may include an active section and a protection section provided on the side face of the active section. The active section is formed by alternately stacking a plurality of dielectric layers and a plurality of internal electrodes. The plurality of internal electrodes are exposed from the side face of the active section. The protective section provided on the side face of the active section is called a side section or side margin section, and covers the internal electrodes exposed from the side face. Conventionally, a configuration has been proposed in which the side section is provided on the side face of the active section, and the angle between the side section and an imaginary line connecting the ends of the internal electrodes is 90 degrees or less (for example, see Japanese Patent Application Publication No. 2012-191159 hereinafter referred to as Patent Document 1). Patent Document 1 states that with such a configuration, a multilayer ceramic electronic device with excellent reliability can be provided.

SUMMARY OF THE INVENTION

According to an aspect of the embodiments, there is provided a multilayer ceramic electronic device including: a ceramic element body that includes a protection section including an end face directed to a first direction, a plurality of circumferential faces that are adjacent to the end face and extend along the first direction, and a ridge portion having a recess extending along the first direction and connecting the plurality of circumferential faces, and includes an active section located inside the protection section; and an external electrode including a base film covering the end face and a plated film formed on the base film, wherein the active section includes a plurality of internal electrodes stacked in a second direction orthogonal to the first direction, wherein the protection section includes a cover section stacked on the active section along the second direction and a side margin section covering the active section from a third direction orthogonal to the first direction and the second direction, wherein the ridge portion includes a first ridgeline portion on a side of the cover section and a second ridgeline portion on a side of the side margin section, with the recess between the first ridgeline portion and the second ridgeline portion, and wherein, in a cross section including the second direction and the third direction, a radius of curvature R1 of the first ridgeline portion is larger than a radius of curvature R2 of the second ridgeline portion.

According to another aspect of the embodiments, there is provided a manufacturing method of a multilayer ceramic electronic device, the method including: forming a ceramic multilayer chip that has an end face directed to a first direction, an active section, and a cover section, the active section having a plurality of internal electrodes stacked in a second direction orthogonal to the first direction, the plurality of internal electrodes being exposed to a side face of the ceramic multilayer chip directed to a third direction orthogonal to the first direction and the second direction, the cover section being stacked on the active section along the second direction, forming a first ridgeline portion adjacent to the end face connecting the circumferential faces extending in the first direction and the side face; forming a ceramic element body by forming a side margin section that is stacked on the side face, extends along the first direction and has a second ridgeline portion formed in parallel with the first ridgeline portion with a recess in between; firing the ceramic multilayer chip and the side margin section; and forming an external electrode including a base film covering the end face and a plated film formed on the base film, wherein the forming of the first ridgeline portion includes chamfering in which a radius of curvature R1 of the first ridgeline portion is larger than a radius of curvature R2 of the second ridgeline portion in a cross section including the second direction and the third direction.

According to another aspect of the embodiments, there is provided a manufacturing method of a multilayer ceramic electronic device, the method including: forming a ceramic element body that has an end face directed to a first direction, an active section, a cover section, a side margin section, circumferential faces extending in the first direction, and a ridge portion connecting the circumferential faces, the active section having a plurality of internal electrodes stacked in a second direction orthogonal to the first direction, the plurality of internal electrodes being exposed to a side face of the ceramic element body directed to a third direction orthogonal to the first direction and the second direction, the cover section being stacked on the active section along the second direction, the side margin being stacked on the side face along the third direction; firing the ceramic element body; in the ridge portion, forming a first ridgeline portion that has a radius of curvature R1 in a cross section including the second direction and the third direction, and a second ridgeline portion that is formed with a recess in between and has a radius of curvature R2 in the cross section smaller than the radius of curvature R1; and forming an external electrode including a base film covering the end face and a plated film formed on the base film.

BRIEF DESCRIPTION OF THE DRAWINGS

FIG. 6A illustrates measuring positions of a radius of curvature and a radius of curvature of a multilayer ceramic capacitor of an embodiment;

FIG. 6B illustrates a measuring method of a radius of curvature and a radius of curvature;

FIG. 6C illustrates another measuring method of a radius of curvature and a radius of curvature;

DETAILED DESCRIPTION

Figure 1:
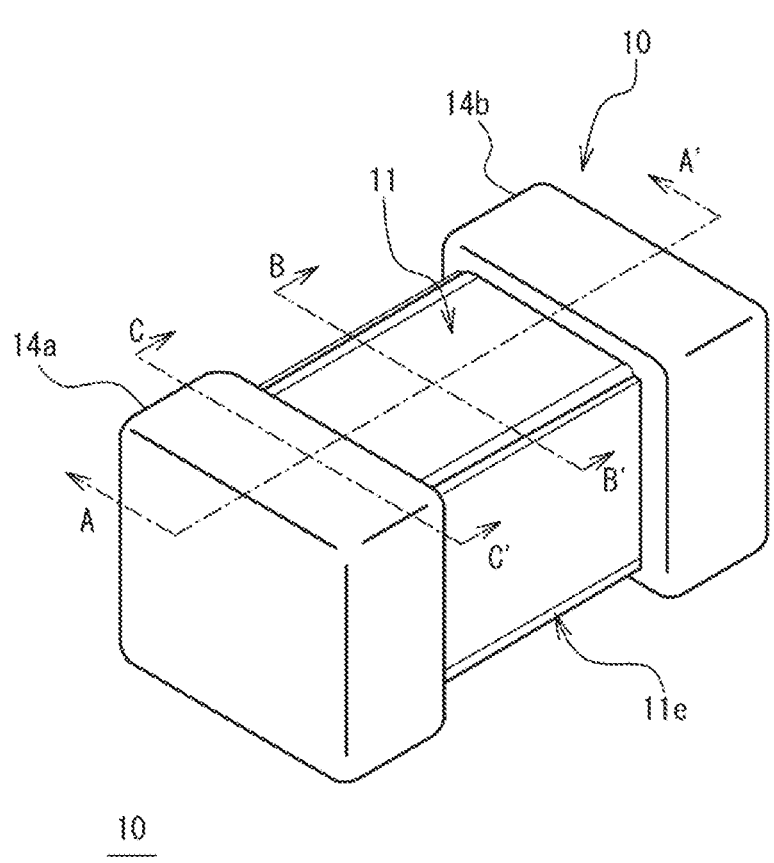
FIG. 1 is a perspective view of a multilayer ceramic capacitor.
Figure 1:
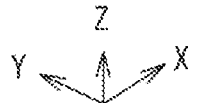

However, the side sections in the configuration described in Patent Document 1 become thinner toward the edges in the stacking direction of the internal electrodes. Therefore, it is conceivable that the impact-reducing effect of the side sections against external impacts is reduced.

Embodiments of the present invention will be described below with reference to the drawings. In the drawings, mutually orthogonal X-axis, Y-axis, and Z-axis are illustrated as appropriate. The X, Y, and Z axes are common to all figures. The X-axis direction corresponds to a first direction, the Y-axis direction corresponds to a third direction, and the Z-axis direction corresponds to a second direction.

Figure 2:
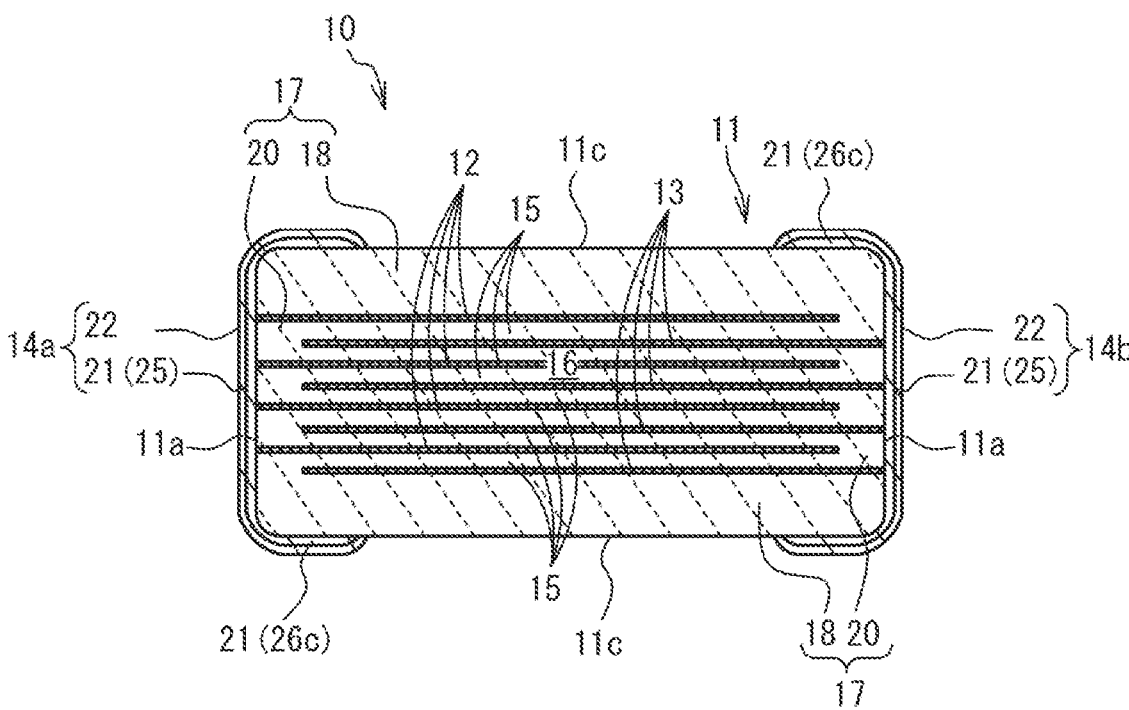
FIG. 2 is a cross-sectional view taken along line A-A' in FIG. 1.
Figure 2:
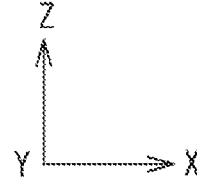
Figure 3:
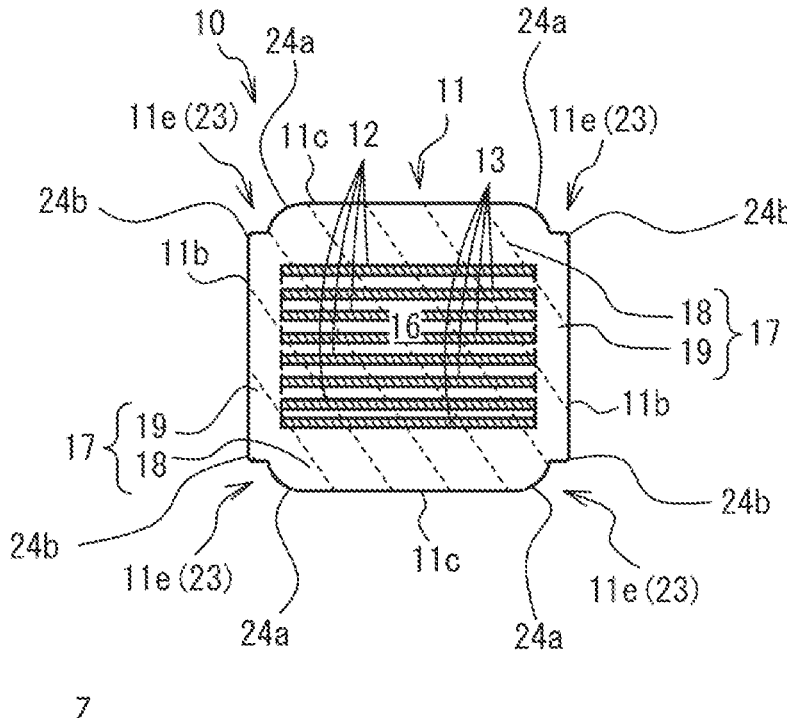
FIG. 3 is a cross-sectional view taken along line B-B' in FIG. 1.
Figure 3:
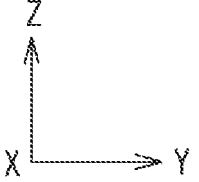

[Overall configuration of multilayer ceramic capacitor 10] FIG. 1 to FIG. 4 are diagrams of a multilayer ceramic capacitor 10 according to a first embodiment of the present invention. FIG. 1 is a perspective view of the multilayer ceramic capacitor 10. FIG. 2 is a cross-sectional view of the multilayer ceramic capacitor 10 taken along line A-A' in FIG. 1. FIG. 3 is a cross-sectional view of the multilayer ceramic capacitor 10 taken along line B-B' in FIG. 1. FIG.

4 is a cross-sectional view of the multilayer ceramic capacitor 10 taken along line C-C' in FIG. 1.

The multilayer ceramic capacitor 10 includes a ceramic element body 11 and two external electrodes 14a and 14b. The two external electrodes 14a and 14b are formed on the surface of the ceramic element body 11, respectively.

The ceramic element body 11 has a capacity section 16 and a protection section 17. The protection section 17 constitutes a peripheral section of the ceramic element body 11, and includes two end faces 11a facing the X-axis direction, two side faces 11b facing the Y-axis direction, and two main faces 11c facing the Z-axis direction, and a ridge portion 11e connecting between the main face 11c and the side face 11b. The side faces 11b and the main faces 11c constitute a plurality of circumferential faces in this embodiment. The end face 11a, the side face 11b, and the main face 11c are, for example, substantially flat faces, but may be rounded.

In detail, the protection section 17 includes cover sections 18 located on the outside of the capacity section 16 in the Z-axis direction, side margin sections 19 located on the outside of the capacity section 16 in the Y-axis direction, and end margin sections 20 located on the outer side in the X-axis direction.

The capacity section 16 is arranged inside the protection section 17 and constitutes an active section in this embodiment. In the capacity section 16, a plurality of first internal electrodes 12 and a plurality of second internal electrodes 13 are stacked in the Z-axis direction via a ceramic layer 15 (see FIG. 2). The internal electrodes 12 and 13 are both sheet-shaped and extend along the X-Y plane, and are arranged alternately along the Z-axis direction.

The internal electrodes 12 and 13 are each made of a good electrical conductor and function as internal electrodes of the multilayer ceramic capacitor 10. The good electrical conductors forming the internal electrodes 12 and 13 is such as a metal of an alloy of which a main component is such as nickel (Ni), copper (Cu), palladium (Pd), platinum (Pt), silver (Ag), gold (Au) or the like.

As illustrated in FIG. 2, the first internal electrode 12 is extracted to one of the end faces 11a of the ceramic element body 11, for example, and connected to the external electrode 14a. The second internal electrode 13 is extracted to the other of the end faces 11a and connected to the external electrode 14b.

The ceramic layer 15 is formed of dielectric ceramics. In the multilayer ceramic capacitor 10, a dielectric ceramic having a high dielectric constant is used to increase the capacity of each of the ceramic layers 15 between the internal electrodes 12 and 13. Examples of high dielectric constant dielectric ceramics is such as a perovskite structure containing barium (Ba) and titanium (Ti), typified by barium titanate ($BaTiO_3$).

In addition to barium titanate, the dielectric ceramics mentioned above also such as strontium titanate ($SrTiO_3$), calcium titanate ($CaTiO_3$), magnesium titanate ($MgTiO_3$), calcium zirconate ($CaZrO_3$), calcium titanate zirconate ($Ca(Zr,Ti)O_3$), barium zirconate ($BaZrO_3$), titanium oxide ($TiO_2$), or the like.

The protection section 17 is also formed of dielectric ceramics. The material forming the protection section 17 may be any insulating ceramic, but by using a material with the same composition as the ceramic layer 15, manufacturing efficiency is improved and internal stress in the ceramic element body 11 is suppressed.

The external electrodes 14a and 14b each include a base film 21 formed to cover the end face 11a, and a plated film 22 formed on the base film 21. The base film 21 is composed of, for example, a baked film made of conductive paste, a sputtered film, or the like. The plated film 22 is a film formed by electrolytic plating. Each of the films of the external electrodes 14a and 14b is mainly composed of, for example, nickel (Ni), copper (Cu), tin (Sn), palladium (Pd), platinum (Pt), silver (Ag), gold (Au) or the like, or an alloy thereof.

The base film 21 of the external electrodes 14a and 14b includes an end face covering portion 25 formed on the end face 11a, a main face covering portion 26c formed on the main face 11c, and a side face covering portion 26b formed on the side face 11b and a recess covering portion 27 formed on a recess 23, which will be described later. In this embodiment, the end face covering portion 25 constitutes a first covering part. The main face covering portion 26c and the side face covering portion 26b constitute a plurality of second covering portions, and the recess covering portion 27 constitutes a third covering part.

In this embodiment, the side face covering portion 26b and the main face covering portion 26c of the base film 21 are separated from the recess covering portion 27 at the ridge portion 11e, and this interrupted portion is also covered with the plated film 22. Hereinafter, the configuration near the ridge portion 11e will be described in detail.

Figure 4:
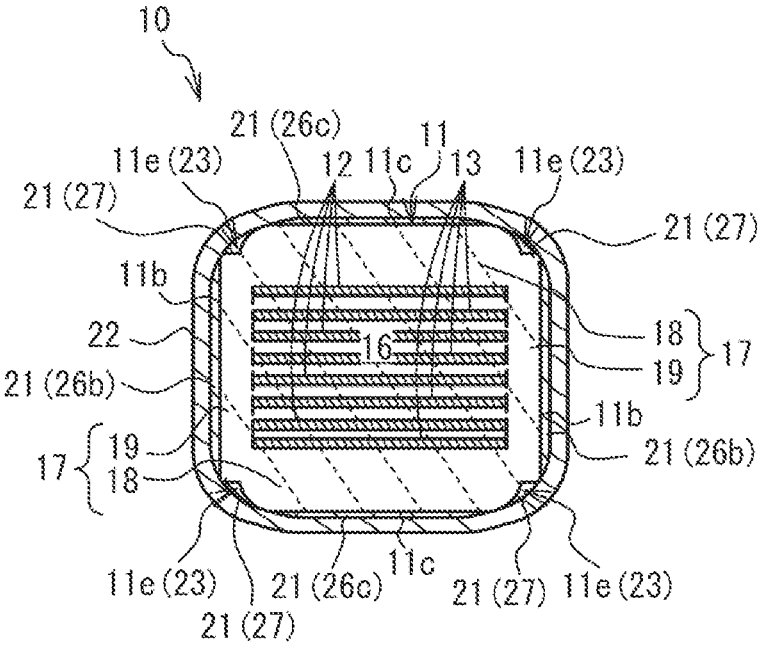
FIG. 4 is a cross-sectional view taken along line C-C' in FIG. 1.
Figure 4:
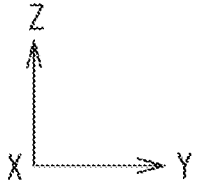
Figure 5:
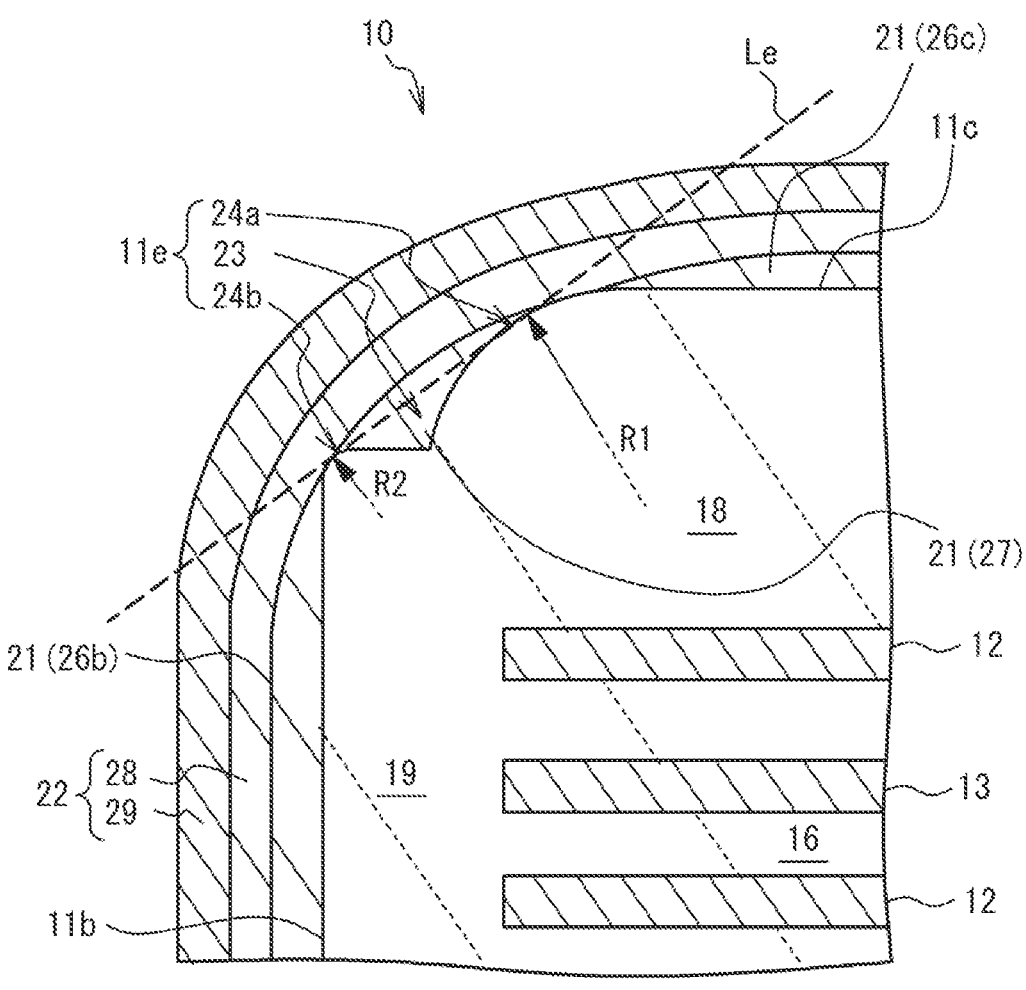
FIG. 5 illustrates an enlarged view of FIG. 4.
Figure 5:
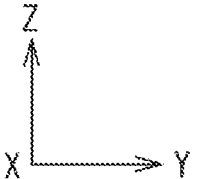

[Detailed configuration of the multilayer ceramic capacitor 10] FIG. 5 is an enlarged view of FIG. 4 and illustrates the structure of the ridge portion 11e and its surroundings. Although FIG. 5 illustrates the configuration of one of the ridge portions 11e and its surroundings, the same applies to the other ridge portions 11e and their surroundings.

The ridge portion 11e has the recess 23 extending along the X-axis direction. A first ridgeline portion 24a is formed on the outer edge of the recess 23. The first ridgeline portion 24a is provided on the cover section 18 side, forms a boundary with the main face 11c, and is convex outward. Further, a second ridgeline portion 24b is formed on the outer edge of the recess 23. The second ridgeline portion 24b is provided on the side margin section 19 side, forms a boundary with the side face 11b, and is convex outward. The first ridgeline portion 24a and the second ridgeline portion 24b are provided with the recess 23 in between, and both extend along the X-axis direction.

A straight line Le connecting the first ridgeline portion 24a and the second ridgeline portion 24b is drawn in a cross section taken in the Z-axis direction, specifically in a cross-section including the Z-axis direction and the Y-axis direction. The recess is a portion that is recessed inward from the straight line Le of the ceramic element body 11. A small step or small unevenness that does not protrude from the straight line Le may be formed in the recess 23.

The first ridgeline portion 24a has an arcuate portion having a radius of curvature R1 in a cross section including the Z-axis direction and the Y-axis direction. Further, the second ridgeline portion 24b has an arc-shaped portion having a radius of curvature R2 in a cross section including the Z-axis direction and the Y-axis direction. The radius of curvature R1 of the first ridgeline portion 24a is larger than the radius of curvature R2 of the second ridgeline portion 24b.

The radius of curvature R1 of the first ridgeline portion 24a can be appropriately set in the range of 15 μm or more and 25 μm or less. Further, the radius of curvature R2 of the second ridgeline portion 24b can be appropriately set in the range of 0 μm or more and 20 μm or less. Although both ranges include overlapping ranges, the condition that the radius of curvature R1 of the first ridgeline portion 24a is larger than the radius of curvature R2 of the second ridgeline portion 24b is applied preferentially, and both values are set within a range that satisfies this condition. Note that the radius of curvature R2 of the second ridgeline portion 24b of 0 μm means that the second ridgeline portion 24b is perpendicular in a cross section including the Z-axis direction and the Y-axis direction.

Here, with reference to FIG. 6A and FIG. 6B, the measuring positions and measuring method of the radius of curvature R1 and the radius of curvature R2 will be described. Referring to FIG. 6A, the length of the external electrode 14a in the direction along the X axis is set to L [14a]. In this embodiment, the radius of curvature R1 and the radius of curvature R2 were measured at a position L [14a]/2 from the end face of the external electrode 14a. Therefore, first, the multilayer ceramic capacitor 10 is polished to a position L [14a]/2 from the end face of the external electrode 14a to expose the cross section. The exposed cross section is then photographed using an optical microscope.

Then, the radius of curvature R1 and the radius of curvature R2 can be measured using the virtual circle Vc against the first ridgeline portion 24a and the second ridgeline portion 24b captured in a photograph as schematically illustrated in FIG. 6B (first method). The radius of curvature R1 and the radius of curvature R2 can be measured in a similar manner. Here, measurement of the radius of curvature R1 of the first ridgeline portion 24a will be explained. First, three points of a first point P1, a second point P2, and a third point P3 are set on the outline of the first ridgeline portion 24a illustrated in the photograph. The first point P1 is set in the following manner. A virtual line L1 extending in the Y-axis direction is set along the main face 11c. The first point P1 is set at a position where this virtual line L1 is away from the first ridgeline portion 24a. The second point P2 is set at the end of the first ridgeline portion 24a opposite to the first point P1. The third point P3 is set at the apex of the first ridgeline portion 24a. The apex (the third point P3) of the first ridgeline portion 24a is specified in the following manner. A virtual line L2 passing through the second point P2 and extending in the Z direction is set. The virtual line L1 and the virtual line L2 are orthogonal to each other. A virtual line L3 is set that passes through the intersection of the virtual lines L1 and L2 and makes an angle of θ=45° from the virtual line L1. The intersection of the virtual line L3 and the outline of the first ridgeline portion 24a is specified as the apex of the first ridgeline portion 24a, and the third point P3 is set at this point.

Then, a virtual circle Vc whose degree of coincidence with the first point P1 to the third point P3 is equal to or higher than a predetermined value is set, and the radius of the virtual circle Vc is set as the radius of curvature R1. The radius of curvature R2 of the second ridgeline portion 24b can also be measured in a similar manner. In this case, the virtual line L1 is set to extend in the Y-axis direction from the first ridgeline portion 24a side, and the second virtual line L2 is set to extend in the Z-axis direction along the side face 11b.

The radius of curvature R1 and the radius of curvature R2 can also be measured by other methods. For example, as illustrated in FIG. 6C, virtual circles Vc of various radii Rn are overlapped with the outline of the first ridgeline portion 24a and the outline of the second ridgeline portion 24b. When the degree of coincidence between the outlines of the first ridgeline portion 24a and the second ridgeline portion 24b, and the virtual circle Vc is equal to or higher than a predetermined value, the radius of the virtual circle Vc may be set as the radius of curvature R1 and the radius of curvature R2 (second method).

The radius of curvature R1 and the radius of curvature R2 can be measured by either the first method or the second method described above. The present embodiment includes a case where the radius of curvature R1 and the radius of curvature R2 measured by the first method satisfy the above-mentioned relationship, and a case where the radius of curvature R1 and the radius of curvature R2 measured by the second method satisfy the above-mentioned relationship. In other words, the case where the radius of curvature R1 and the radius of curvature R2 measured by the first method satisfy the above relationship, but the radius of curvature R1 and the radius of curvature R2 measured by the second method do not satisfy the above relationship is included in the present embodiment. Moreover, the case where the radius of curvature R1 and the radius of curvature R2 measured by the first method do not satisfy the above relationship, but the radius of curvature R1 and the radius of curvature R2 measured by the second method satisfy the above relationship is included in the present embodiment. Of course, the case where the radius of curvature R1 and the radius of curvature R2 measured by the first method satisfy the above-mentioned relationship, and the radius of curvature R1 and the radius of curvature R2 measured by the second method satisfy the above-mentioned relationship is included in the present embodiment.

Note that the measurement position is an example, and other positions along the X-axis direction may be used as the measurement position, or a plurality of positions may be used as the measurement position. If measurements are taken at multiple locations, the average value may be used.

As described above, the main face covering portion 26c of the base film 21 is formed on the main face 11c, and the side face covering portion 26b of the base film 21 is formed on the side face 11b. The recess covering portion 27 of the base film 21 is formed on the recess 23. The recess covering portion 27 is spaced apart from at least one of the main face covering portion 26c and the side face covering portion 26b at the ridge portion 11e. In this embodiment, the recess covering portion 27 is spaced apart from both the main face covering portion 26c and the side face covering portion 26b.

In this embodiment, the plated film 22 has a multilayer structure. The plated film 22 includes an intermediate film 28 formed on the base film 21 and a surface film 29 formed on the intermediate film 28. The intermediate film 28 and the surface film 29 continuously cover the end face covering portion 25, the main face covering portion 26c, the side face covering portion 26b, and the recess covering portion 27 of the base film 21. The metal materials constituting the intermediate film 28 and the surface film 29 may be the same or different. The metal material may be selected from copper, nickel, tin or alloys thereof, for example.

Since the base film 21 has the main face covering portion 26c, the side face covering portion 26b, and the recess covering portion 27 that are spaced apart from each other, defects such as cracks in the ceramic element body 11 caused by temperature changes can be prevented.

The electrode material forming the base film 21 and the ceramic material forming the ceramic element body 11 have different coefficients of linear expansion. As a result, the base film 21 contracts more than the ceramic element body 11 when the base film 21 is cooled after baking or after the heat generated after mounting, and tensile stress is generated in the base film 21. On the other hand, compressive stress is generated in the ceramic element body 11 due to the tensile stress.

For example, tensile stress directed inward in the Y-axis direction is generated in the main face covering portion 26c of the base film 21. For example, tensile stress directed inward in the Z-axis direction is generated in the side face covering portion 26b of the base film 21. As a result, tensile stress in different directions is generated in the base film 21 near the ridge portion 11e.

In this embodiment, the main face covering portion 26c and the side face covering portion 26b are separated from each other. This prevents stress from being accumulated in the base film 21 even when the above-mentioned tensile stress occurs. Therefore, it is possible to suppress defects such as cracks from occurring in the ceramic element body 11 due to large compressive stress occurring in the ceramic element body 11.

Furthermore, in this embodiment, the recess covering portion 27 is formed on the recess 23. Due to the recess covering portion 27, the electrode material of the base film 21 remains within the recess 23, and the separation width between the base films 21 can be minimized.

In this embodiment, the recess covering portion 27 is formed by the electrode material remaining within the recess 23. Thereby, the separation width between the main face covering portion 26c or the side face covering portion 26b and the recess covering portion 27 in the base film 21 is regulated, and the plated film 22 can continuously cover the entire base film 21. This prevents the generation of gaps between the external electrodes 14a and 14b and the ceramic element body 11, and prevents poor insulation. Therefore, the reliability of the multilayer ceramic capacitor 10 can be improved.

Figure 7A:
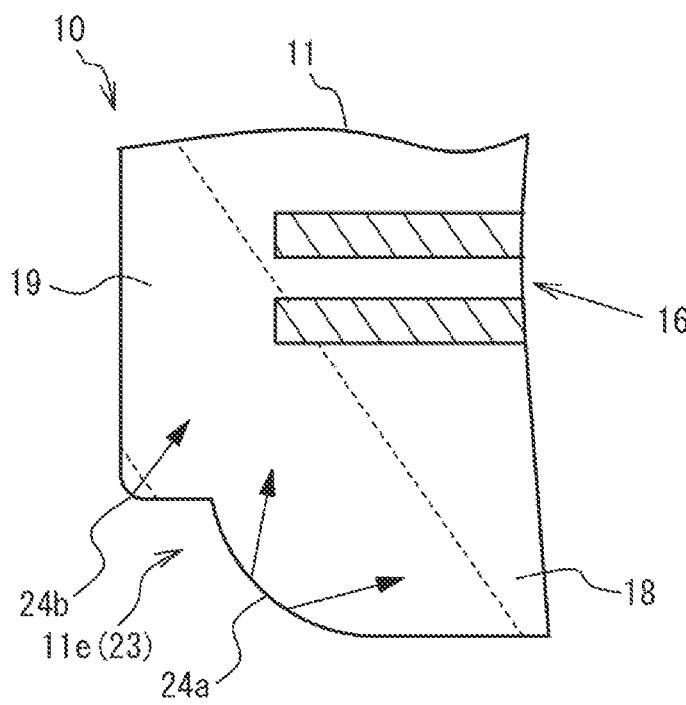
FIG. 7A illustrates a partially enlarged cross section indicating a first ridgeline portion and a second ridgeline portion of a multilayer ceramic capacitor of an embodiment.
Figure 7B:
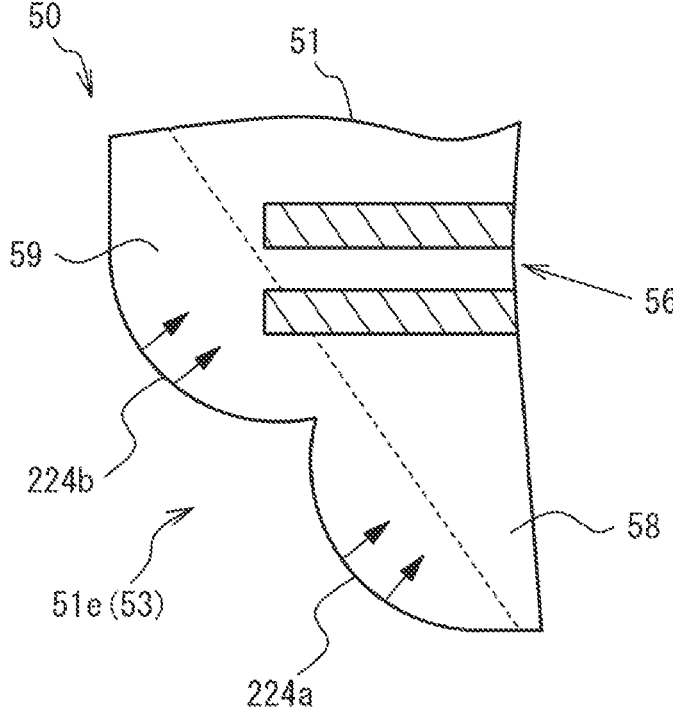
FIG. 7B illustrates a partially enlarged cross section indicating a first ridgeline portion and a second ridgeline portion of a multilayer ceramic capacitor of Comparative Example.
Figure 8A:
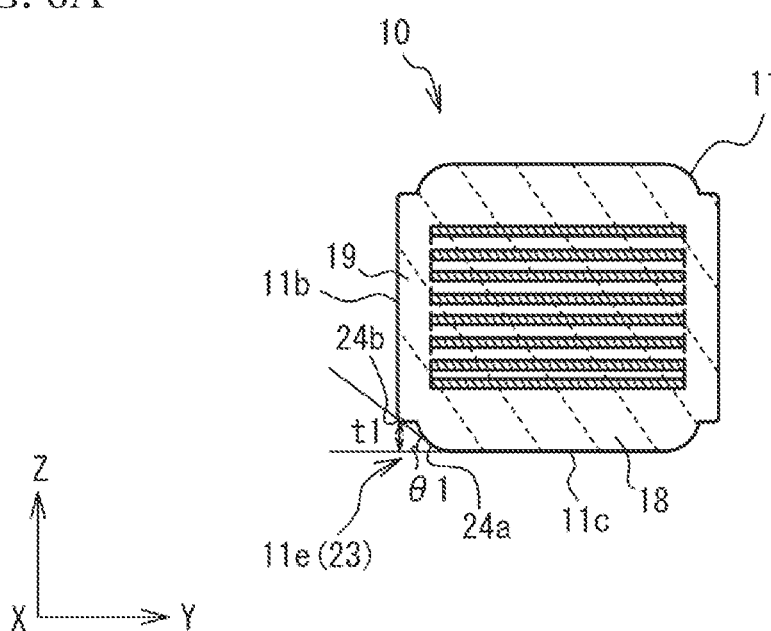
FIG. 8A illustrates an angle θ1 between a tangent connecting a first ridgeline portion and a second ridgeline portion and a line segment extending along a Y-axis direction from a main face of a ceramic element body in a multilayer ceramic capacitor of an embodiment, and a height t1 from an installation surface to the second ridgeline portion.
Figure 8B:
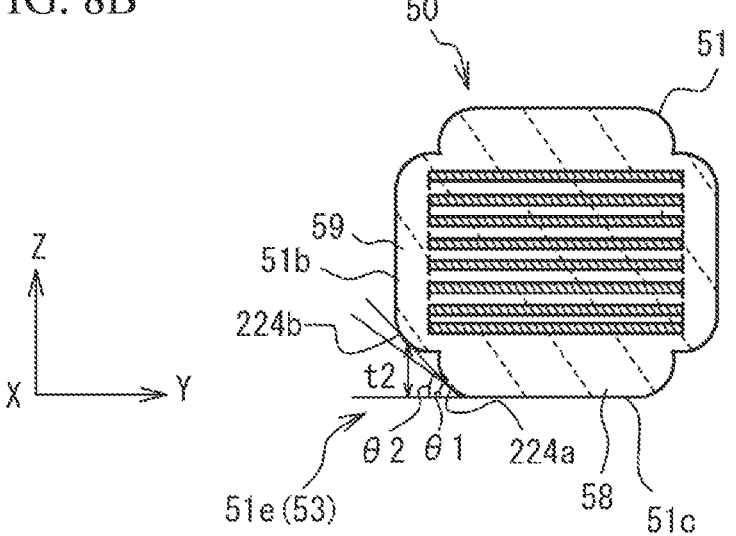
FIG. 8B illustrates an angle θ2 between a tangent connecting a first ridgeline portion and a second ridgeline portion and a line segment extending along a Y-axis direction from a main face of a ceramic element body in a multilayer ceramic capacitor of Comparative Example, and a height t2 from an installation surface to the second ridgeline portion.

Here, the effect of setting the radius of curvature R1 of the first ridgeline portion 24a to be larger than the radius of curvature R2 of the second ridgeline portion 24b will be explained in comparison with Comparative Example. FIG. 7A is a partially enlarged cross-sectional view illustrating the periphery of the first ridgeline portion 24a and the periphery of the second ridgeline portion 24b. FIG. 8A is a cross-sectional view of the multilayer ceramic capacitor 10 of the embodiment. FIG. 7B is a partially enlarged sectional view illustrating the periphery of the first ridgeline portion 224a and the periphery of the second ridgeline portion 224b. FIG. 8B is a sectional view of a multilayer ceramic capacitor 50 of Comparative Example.

The multilayer ceramic capacitor 50 of Comparative Example includes a ridge portion 51e similarly to the multilayer ceramic capacitor 10 of the embodiment. Furthermore, the multilayer ceramic capacitor 50 includes a cover section 58 and a side margin section 59 around a capacity section 56. The ridge portion 51e has a recess 53 extending along the X-axis direction. A first ridgeline portion 224a is formed on the outer edge of the recess 53, which is provided on the cover section 58 side, forms a boundary with a main face 51c, and is convex outward. Further, a second ridgeline portion 224b is formed on the outer edge of the recess 53, which is provided on the side margin section 59 side, forms a boundary with a side face 51b, and is convex outward. The first ridgeline portion 224a and the second ridgeline portion 224b are provided with the recess 53 in between, and both extend along the X-axis direction.

The first ridgeline portion 224a has an arcuate portion in a cross section including the Z-axis direction and the Y-axis direction. Further, the second ridgeline portion 24b has an arcuate portion in a cross section including the Z-axis direction and the Y-axis direction. Here, the radius of curvature of the first ridgeline portion 24a and the radius of curvature of the second ridgeline portion 24b are approximately the same. This point is different from the multilayer ceramic capacitor 10 of the embodiment.

Referring to FIG. 7A, the propagation of force when an impact force is applied to the ridge portion 11e of the multilayer ceramic capacitor 10 of the embodiment is schematically depicted. The radius of curvature R1 of the first ridgeline portion 24a is different from the radius of curvature R2 of the second ridgeline portion 24b. Therefore, the input direction of the impact force is different between the first ridgeline portion 24a and the second ridgeline portion 24b. Therefore, it is expected that the impact force propagated inside the ceramic element body 11 is canceled out within the ceramic element body 11. As a result, the impact force directed toward the capacity section 16 is alleviated.

On the other hand, referring to FIG. 7B, the propagation of force when an impact force is applied to the ridge portion 51e of the multilayer ceramic capacitor 50 of Comparative Example is schematically depicted. The radius of curvature of the first ridgeline portion 224a and the radius of curvature R of the second ridgeline portion 224b are approximately the same. Therefore, the input direction of the impact force is approximately the same between the first ridgeline portion 224a and the second ridgeline portion 224b. For this reason, it is considered that the effect of canceling out the impact force propagated inside a ceramic element body 51 in the ceramic element body 51 as in the multilayer ceramic capacitor 10 of the embodiment is low.

Referring to FIG. 8A, an angle θ1 between a tangent connecting the first ridgeline portion 24a and the second ridgeline portion 24b and a line segment extending along the Y-axis direction from the main face 11c of the ceramic element body 11 is illustrated. Also illustrated is the height t1 from the main face 11c, which is the installation surface of the multilayer ceramic capacitor 10, to the second ridgeline portion 24b. Referring to FIG. 8B, for Comparative Example, the angle θ2 formed by the tangent connecting the first ridgeline portion 224a and the second ridgeline portion 224b with a line segment extending from the main face 51c of the ceramic element body 51 along the Y-axis direction is illustrated. Also illustrated is the height t2 from a main face 41c, which is the installation surface of the multilayer ceramic capacitor 50, to the second ridgeline portion 224b.

The angle θ1 is smaller than the angle θ2, and the height t1 is lower than the height t2. Therefore, the multilayer ceramic capacitor 10 of the embodiment is less likely to fall down during mounting compared to the multilayer ceramic capacitor 50 of Comparative Example.

Note that in the multilayer ceramic capacitor 10 of this embodiment, the radius of curvature R1 of the first ridgeline portion 24a is larger than the radius of curvature R of the second ridgeline portion 24b. If the radius of curvature R2 of the second ridgeline portion 24b is made larger than the radius of curvature R1 of the first ridgeline portion 24a, the region in which the thickness of the side margin section 19 is thinner increases. This is because as the radius of curvature increases, the area to be chamfered becomes wider and the drawn arc approaches the inside of the ceramic element body 11. In this embodiment, in order to avoid this, the radius of curvature R1 is made larger than the radius of curvature R2.

Figure 9:
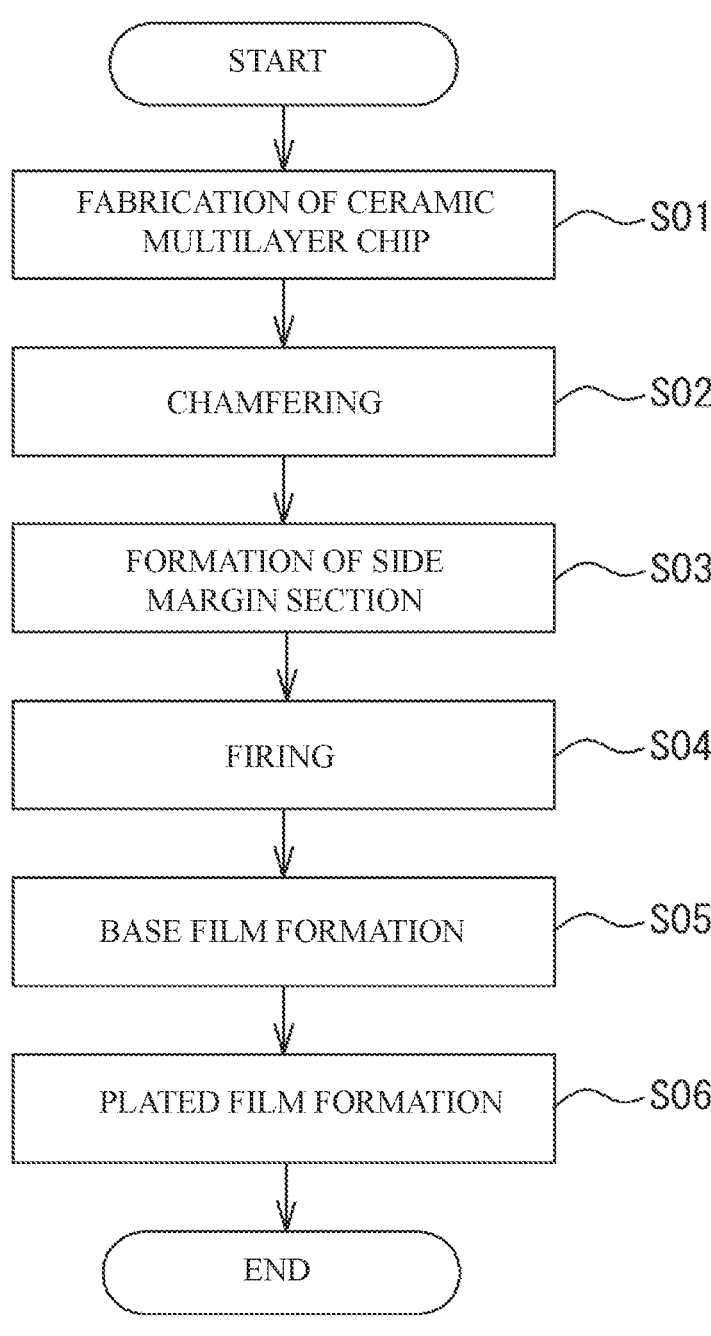
FIG. 9 illustrates a flow of a manufacturing method of a multilayer ceramic capacitor.

[Method for manufacturing multilayer ceramic capacitor 10] FIG. 9 is a flowchart of a method for manufacturing the multilayer ceramic capacitor 10. FIG. 10 to FIG. 17 are diagrams schematically illustrating the manufacturing process of the multilayer ceramic capacitor 10. The method for manufacturing the multilayer ceramic capacitor 10 will be described below along with FIG. 9 and with appropriate reference to FIG. 10 to FIG. 17.

(Step S01: Fabrication of ceramic multilayer chip C) In step S01, the ceramic sheets 101 and 102 for forming the capacity section 16 and the ceramic sheet 103 for forming the cover section 18 are stacked and cut to form an unfired ceramic multilayer chip (multilayer chip) C.

Figure 10:
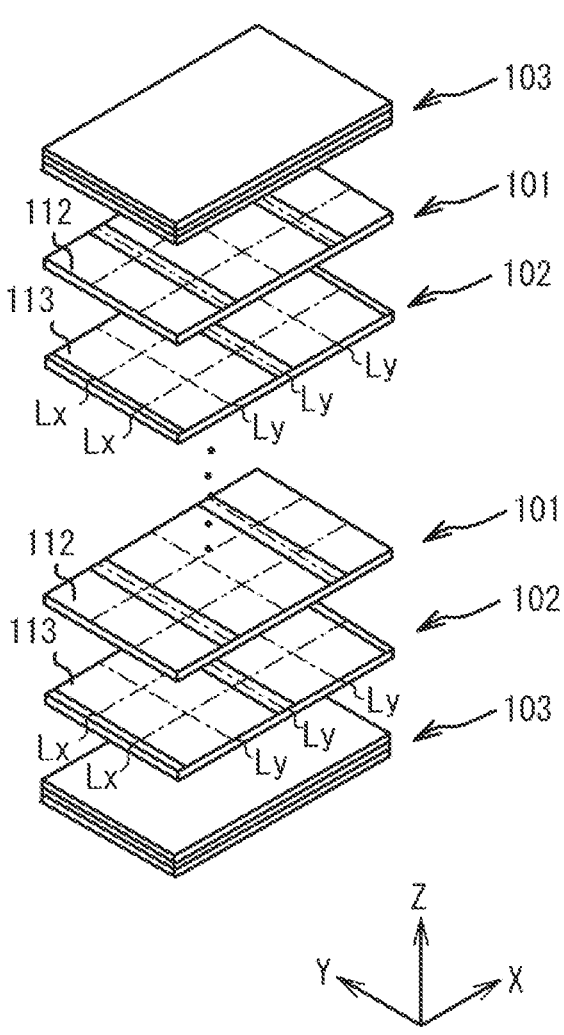
FIG. 10 illustrates a perspective view of a manufacturing method of a multilayer ceramic capacitor.
Figure 11:
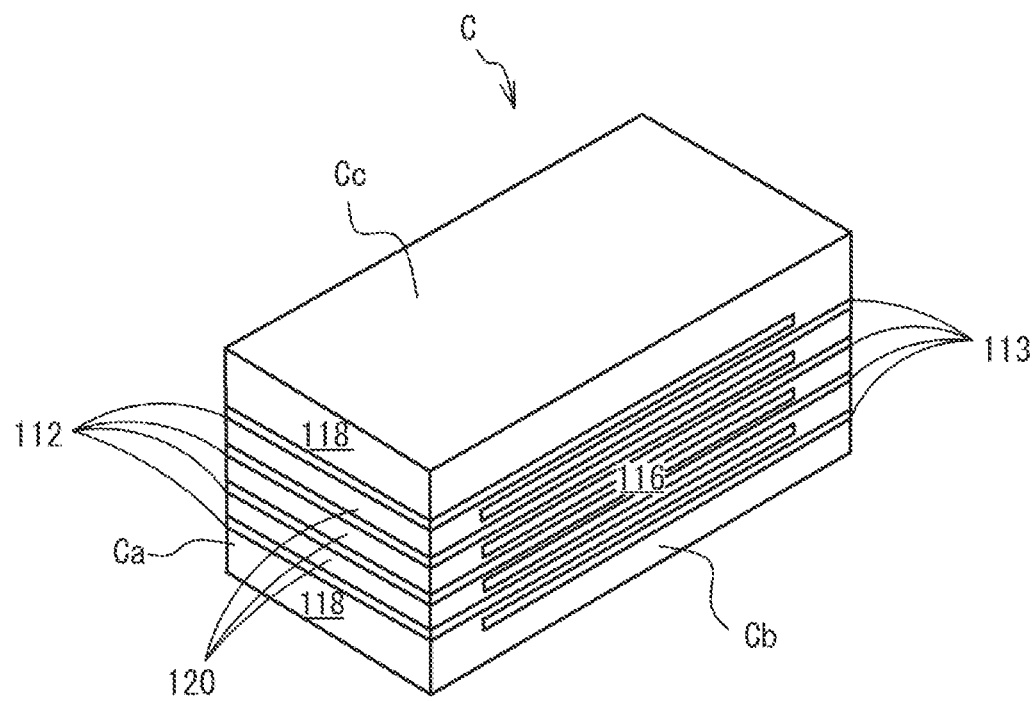
FIG. 11 illustrates a perspective view of a manufacturing method of a multilayer ceramic capacitor.
Figure 11:
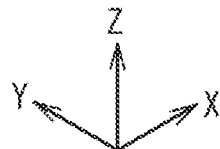
Figure 12:
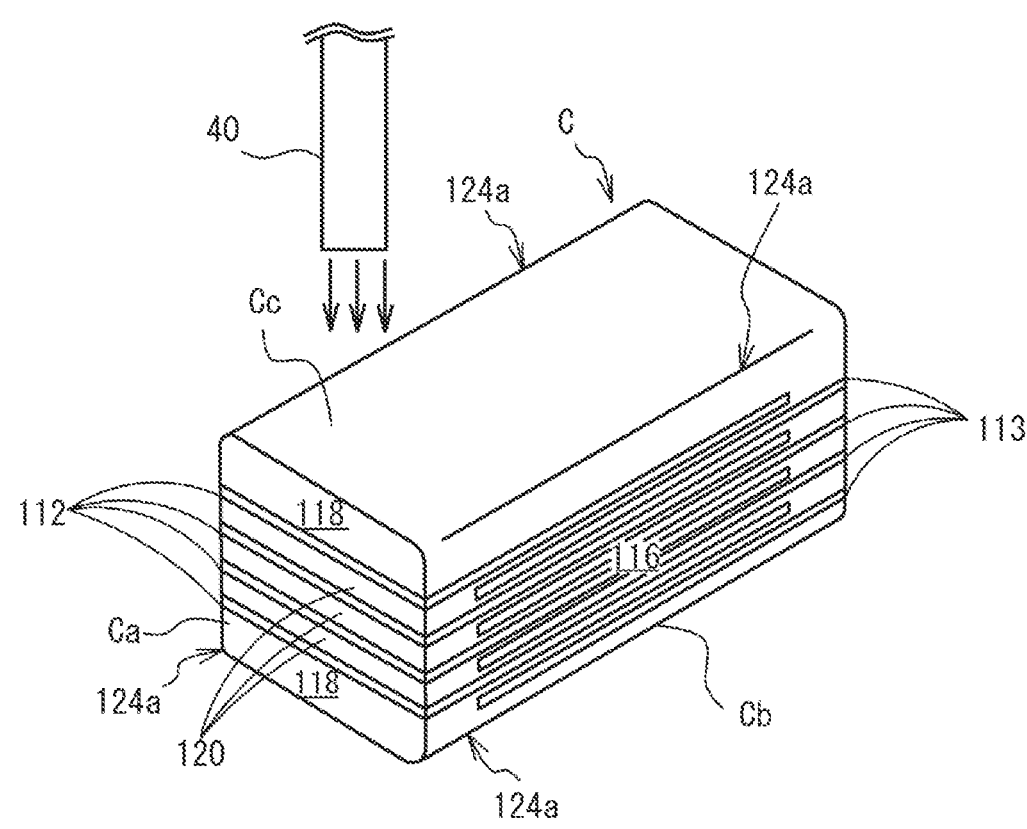
FIG. 12 illustrates a perspective view of a manufacturing method of a multilayer ceramic capacitor.
Figure 12:
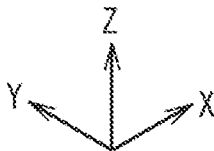

The ceramic sheets 101, 102, and 103 illustrated in FIG. 10 are configured as unfired dielectric green sheets containing a ceramic material made of dielectric ceramic, an organic binder, and other additives. An unfired first internal electrode 112 corresponding to the first internal electrode 12 is formed on the ceramic sheet 101. An unfired second internal electrode 113 corresponding to the second internal electrode 13 is formed on the ceramic sheet 102. The ceramic sheet 103 has no internal electrodes formed thereon.

Each of the internal electrodes 112 and 113 has a plurality of strip-shaped electrode patterns extending across a cutting line Lx parallel to the X-axis direction and along a cutting line Ly parallel to the Y-axis direction. These internal electrodes 112 and 113 are formed by applying conductive paste to the ceramic sheets 101 and 102 by a printing method or the like.

As illustrated in FIG. 10, the ceramic sheets 101 and 102 are alternately stacked in the Z-axis direction. A stacked body of the ceramic sheets 101 and 102 corresponds to the capacity section 16 and the end margin section 20. The ceramic sheets 103 are stacked on the top and bottom faces of the multilayer structure of the ceramic sheets 101 and 102 in the Z-axis direction. The multilayer structure of the ceramic sheets 103 corresponds to the cover section 18. Note that the number of stacked ceramic sheets 101, 102, 103 or the like can be adjusted as appropriate.

Subsequently, the multilayer structure of the ceramic sheets 101, 102, and 103 is crimped from the Z-axis direction and cut along cutting lines Lx and Ly. As a result, the multilayer chip C illustrated in FIG. 9 is manufactured.

The multilayer chip C has an unfired capacity section 116 in which the unfired internal electrodes 112 and 113 are formed, an unfired cover section 118, and an unfired end margin section 120. The multilayer chip C has a side face Cb, which is a cut face corresponding to the cutting line Lx, and an end face Ca, which is a cut face corresponding to the cutting line Ly. Ends of the unfired internal electrodes 112 and 113 are exposed from the side face Cb.

(Step S02: Formation of a first ridgeline portion 124a) In step S02, the first ridgeline portion 124a is formed at a side portion connecting the side face Cb and main face Cc of the multilayer chip C. The first ridgeline portion 124a is a portion corresponding to the first ridgeline portion 24a after firing, and is processed into an arc shape so as to have the radius of curvature R1 of the first ridgeline portion 24a after firing. In this embodiment, chamfering is performed by blasting using a nozzle 40 to form the first ridgeline portion 124a. Note that other conventionally known construction methods may be employed as long as they can realize the first ridgeline portion 24a having a desired circular arc shape.

(Step S03: Forming a side margin section 119) In step S03, the side margin section 119 is formed on the side face Cb of the multilayer chip C. An example of the formation method will be shown below.

Figure 13:
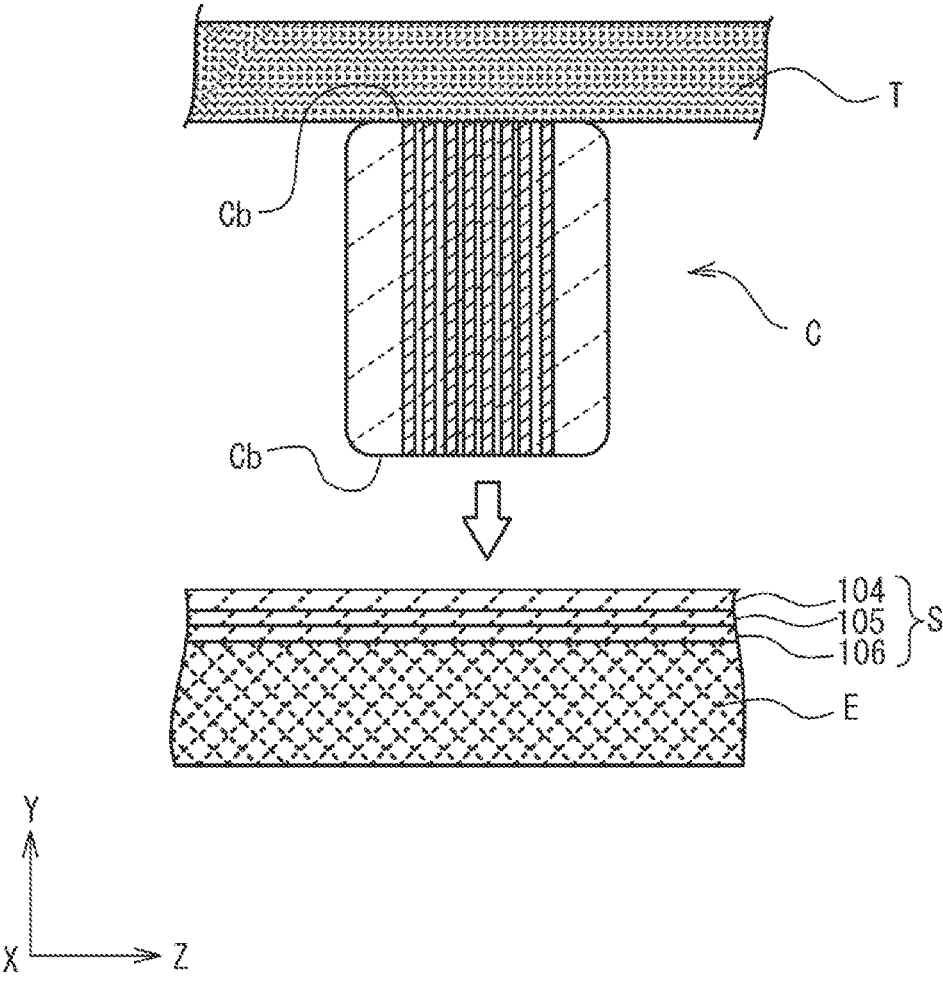
FIG. 13 illustrates a schematic cross sectional view of a manufacturing method of a multilayer ceramic capacitor.

First, as illustrated in FIG. 13, stacked sheets S, which are a multilayer structure of ceramic sheets, is placed on a flat elastic member E, and the other side face Cb of the multilayer chip C held with one side face Cb held by a tape T is made to face the stacked sheets S.

In this embodiment, the stacked sheets S have a multilayer structure of first ceramic sheets 104, second ceramic sheets 105, and third ceramic sheets 106 for forming the side margin section. Each of the ceramic sheets 104, 105, 106, like the ceramic sheets 101, 102, 103, includes a ceramic material, an organic binder, and other additives.

The second ceramic sheet 105 has a higher thermal shrinkage rate than the first ceramic sheet 104. Furthermore, the third ceramic sheet 106 has a higher thermal shrinkage rate than the second ceramic sheet 105. Thermal shrinkage rate can be adjusted by adjusting the amount of the organic binder and the additives.

Figure 14:
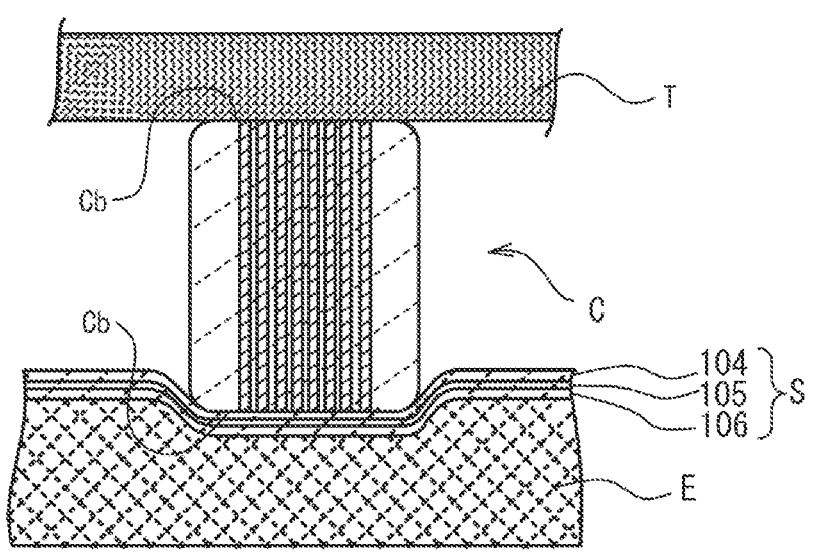
FIG. 14 illustrates a schematic cross sectional view of a manufacturing method of a multilayer ceramic capacitor.

Next, as illustrated in FIG. 14, the stacked sheets S are pasted on the side face Cb of the multilayer chip C by punching out the stacked sheets S on the side face Cb. Specifically, the multilayer chip C is strongly pressed against the stacked sheets S in the Y-axis direction. As a result, the multilayer chip C sinks locally and deeply into the elastic member E together with the stacked sheets S. At this time, a shear force acts on the stacked sheets S along the outer edge of the side face Cb, and when this shear force exceeds the shear strength of the stacked sheets S, the stacked sheets S are punched out.

Figure 15:
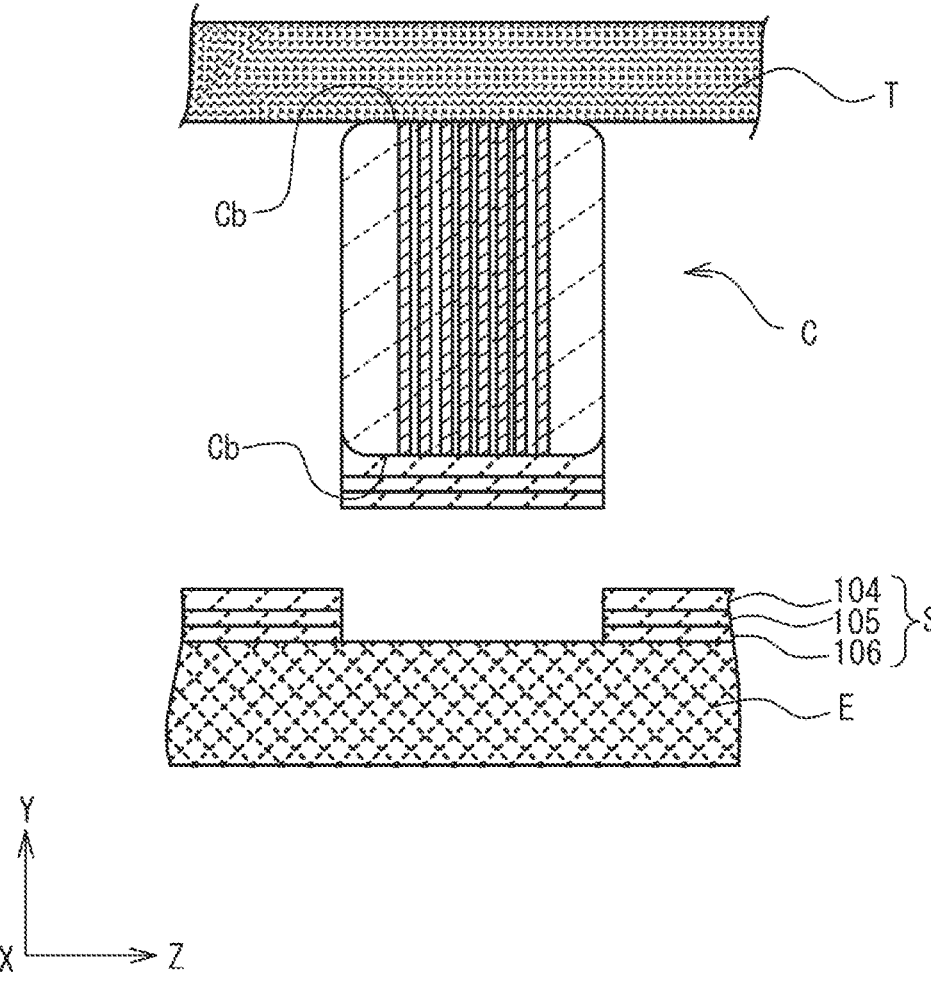
FIG. 15 illustrates a schematic cross sectional view of a manufacturing method of a multilayer ceramic capacitor.

Then, as illustrated in FIG. 15, a part of the stacked sheets S that has sunk together with the multilayer chip C is cut off. As a result, a first side margin section 119a stacked on the side face Cb and a second side margin section 119b stacked on the first side margin section 119a are formed. Furthermore, in this embodiment, a third side margin section 119c is formed stacked on the second side margin section 119b. As a result, the unfired side margin section 119 including the first side margin section 119a, the second side margin section 119b, and the third side margin section 119c is formed on the side face Cb of the multilayer chip C.

Figure 16:
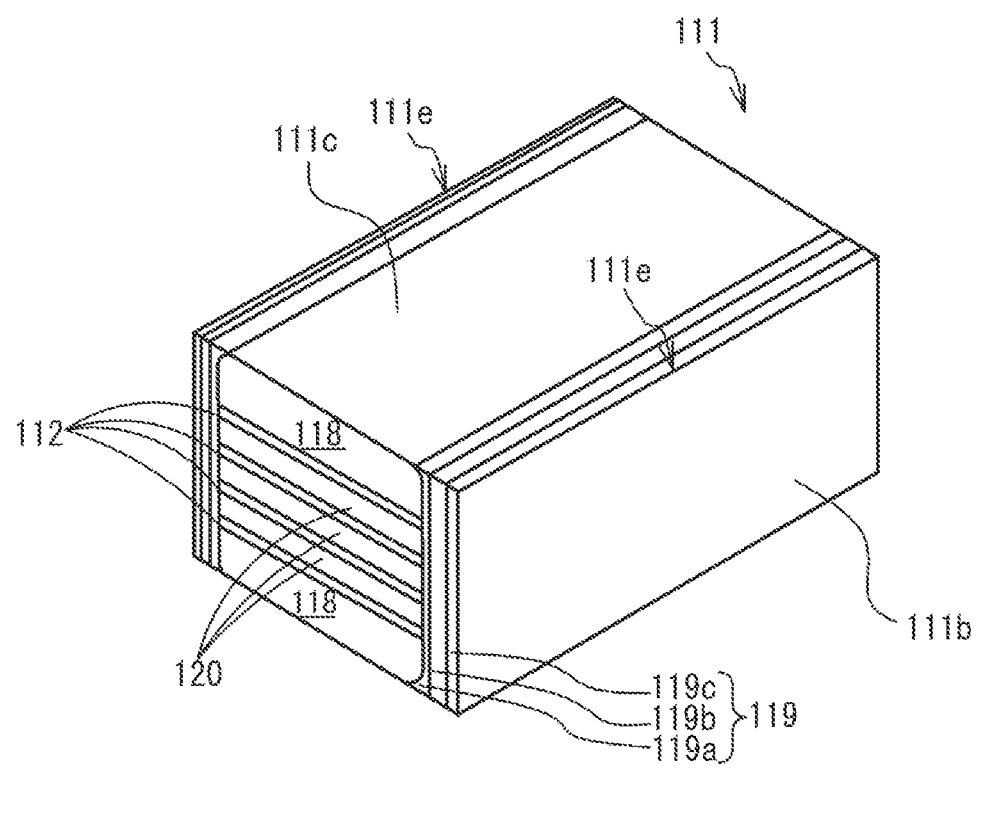
FIG. 16 illustrates a perspective view of a manufacturing method of a multilayer ceramic capacitor.
Figure 16:
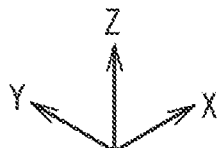

The side margin section 119 is similarly formed on the other side face Cb. As a result, an unfired ceramic element body 111 illustrated in FIG. 16 is produced. At this stage, the recess 23 is not formed in a ridge portion 111e between a main face 111c and a side face 111b.

(Step S04: Firing) In step S04, the ceramic element body 11 of the multilayer ceramic capacitor 10 illustrated in FIG. 17 and FIG. 1 to FIG. 3 is produced by firing the ceramic element body 111 obtained in step S03. The firing temperature in step S04 can be determined based on the sintering temperature of the ceramic element body 111. Further, the firing can be performed, for example, under a reducing atmosphere or under a low oxygen partial pressure atmosphere.

By firing, each of the side margin portions 119a, 119b and 119c thermally shrinks at a different rate. Specifically, the second side margin section 119b contracts by a larger amount than the first side margin section 119a. The third side margin section 119c contracts by a larger amount than the second side margin section 119b.

Figure 17:
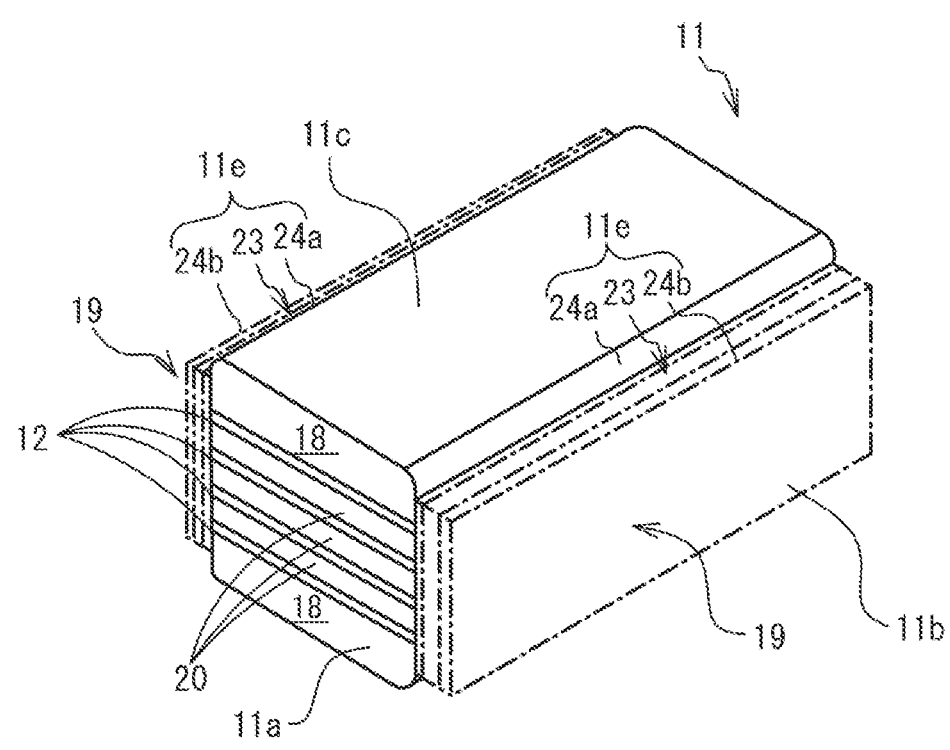
FIG. 17 illustrates a perspective view of a manufacturing method of a multilayer ceramic capacitor.
Figure 17:

As a result, as illustrated in FIG. 17, a gentle step or slope is formed on the ridge portion 11e of the ceramic element body 11. The outer edges of each of the side margin sections 119a, 119b and 119c contract inward in the Z-axis direction in this order to form the recess 23. The outer edge of the third side margin section 119c forms the second ridgeline portion 24b.

By setting the thermal shrinkage rate of the third side margin section 119c, the radius of curvature R2 of the second ridgeline portion 24b formed after firing can be adjusted to a desired value. Moreover, in order to realize the desired radius of curvature R2, chamfering may be performed on the second ridgeline portion 24b after firing. For chamfering, a blasting method or a conventionally known method can be used. When processing the second ridgeline portion 24b, the first ridgeline portion 24a may be affected by the processing. Therefore, in the chamfering process on the first ridgeline portion 24a in step S02, it is possible to perform the process in consideration of the influence of the process on the second ridgeline portion 24b. Furthermore, the chamfering process on the second ridgeline portion 24b may be performed before firing.

Note that in FIG. 17, the sections corresponding to the side margin sections 119a, 119b and 119c in the side margin section 19 are illustrated by dashed-dotted lines, but the boundaries become almost invisible after firing.

(Step S05: Base film formation) In step S05, the conductive base film 21 including an end face covering portion 26a formed on the end face 11a, the side face covering portion 26b formed on the side face 11b, the main face covering portion 26c formed on the main face 11c, the recess covering portion 27 spaced from the side face covering portion 26b and the main face covering portion 26c formed on the recess 23 is formed.

Specifically, first, an unfired electrode material is applied to the end face 11a, and also to a part of the side face 11b, the main face 11c, and the ridge portion 11e that are connected to the end face 11a. The applying method is, for example, a dipping method. In the dipping method, the end face 11a side of the ceramic element body 11 is immersed in a dipping bath containing the electrode material such as a conductive paste. Thereby, the unfired electrode material can be applied to the side face 11b, the main face 11c, and the recess 23 almost simultaneously with the end face 11a.

The unfired electrode material is applied thinly so that the recess covering portion 27, the side face covering portions 26b, and the main face covering portions 26c after baking are spaced apart from each other. However, these do not need to be separated at the time of application. The applying thickness of the electrode material can be adjusted by adjusting the dipping time, pulling speed, viscosity of the electrode material, or the like.

Note that the method for forming the base film is not limited to the dipping method, and may be, for example, a printing method, a sputtering method, or a combination of these methods.

Next, the unfired electrode material is baked. Baking can be performed, for example, under a reducing atmosphere or under a low oxygen partial pressure atmosphere. During baking, the electrode material formed on each face contracts due to heat. The shrinkage rate of the electrode material is greater than the shrinkage rate of the ceramic element body 11. Therefore, the electrode material applied to each face generates tensile stress in the direction away from the ridge portion 11e. Thereby, the recess covering portion 27, the side face covering portion 26b, and the main face covering portion 26c are formed spaced apart from each other.

(Step S06: Plated film formation) In step S06, the plated film 22 is formed to continuously cover the end face covering portion 26a, the side face covering portion 26b, the main face covering portion 26c, and the recess covering portion 27. Specifically, the multilayer ceramic capacitor 10 on which the base film 21 is formed is immersed in a plating solution corresponding to each of the intermediate film 28 and the surface film 29 to perform electrolytic plating. As a result, the plated film 22 having a plurality of layers including the intermediate film 28 and the surface film 29 is formed.

Through the above steps, the multilayer ceramic capacitor 10 illustrated in FIG. 1 to FIG. 3 is manufactured. In this embodiment, the side margin sections 119 are added to the multilayer chip C layer, so that the end portions of the internal electrodes 112 and 113 are aligned within a range of 0.5 μm in the Y-axis direction. Thereby, the proportion of the volume occupied by the capacity section 16 within the ceramic element body 11 can be increased, and the capacity can be increased without increasing the size of the multilayer ceramic capacitor 10.

[Other embodiments] Although each embodiment of the present invention has been described above, the present invention is not limited only to the above-described embodiments, and it goes without saying that various changes can be made without departing from the gist of the present invention.

The number of the ceramic sheets forming each of the side margin sections 19 is not limited to three. For example, by using two or more and four or less ceramic sheets to form the side margin section 19, it is possible to form the recess 23 in a desired shape, and to prevent problems such as peeling of the side margin section 19 after pasting.

For example, in the above embodiment, it has been explained that the unfired side margin section 119 is formed by pasting the stacked sheets S in which different ceramic sheets are stacked, but a plurality of ceramic sheets may be pasted one by one.

Furthermore, the method of attaching the ceramic sheet is not limited to sheet punching, and a ceramic sheet cut in advance to a predetermined size may be attached to the side face Cb.

Alternatively, the side margin section 19 may be formed by applying ceramic materials having different thermal shrinkage rates to the side face Cb of the multilayer chip C in a layered manner. This also makes it possible to form a multilayer structure of a plurality of side margin portions having different thermal shrinkage rates.

Furthermore, the recess can also be formed by forming the cover section 18 with a plurality of ceramic sheets having different thermal shrinkage rates. In this case, a plurality of ceramic sheets each having a side margin section formed around the internal electrode are stacked, and a plurality of ceramic sheets whose thermal shrinkage rate gradually increases are stacked above and below in the Z-axis direction. As a result, a ridge including a concave portion is formed at the outer edge of the ceramic sheet for forming the cover section.

Further, the method is not limited to forming the recesses by thermal shrinkage of the ceramic material, but the recesses may be formed by grinding the ridges of the ceramic element body formed in the shape of a rectangular parallelepiped.

Furthermore, the multilayer ceramic capacitor can be of a so-called taller type, in which the dimension along the Z-axis direction is larger than the dimension along the Y-axis direction.

EXAMPLE

Next, the results of the impact test for Example will be explained together with Comparative Example. Example corresponds to the multilayer ceramic capacitor 10 of the embodiment and has the dimensions described below. In Comparative Example, the multilayer ceramic capacitor 50 as illustrated in FIG. 7B or FIG. 8B has the dimensions described below.

The conditions for the impact test are shown below.
Equipment (test equipment): 1220 manufactured by IMY Corporation Test method: Place the product to be tested (a multilayer ceramic capacitor) into the specified plastic case and vibrate it.
Test target product dimensions: 0603 (Length×Width× Height=0.6 mm×0.3 mm×0.3 mm) Number of test subjects: 7,000 pieces (assuming 0603 shape)
Vibration frequency: 10 Hz
Number of cycles: 600 times
Evaluation method: Visual evaluation using a stereomicroscope (n=100 pieces)

Figure 18:
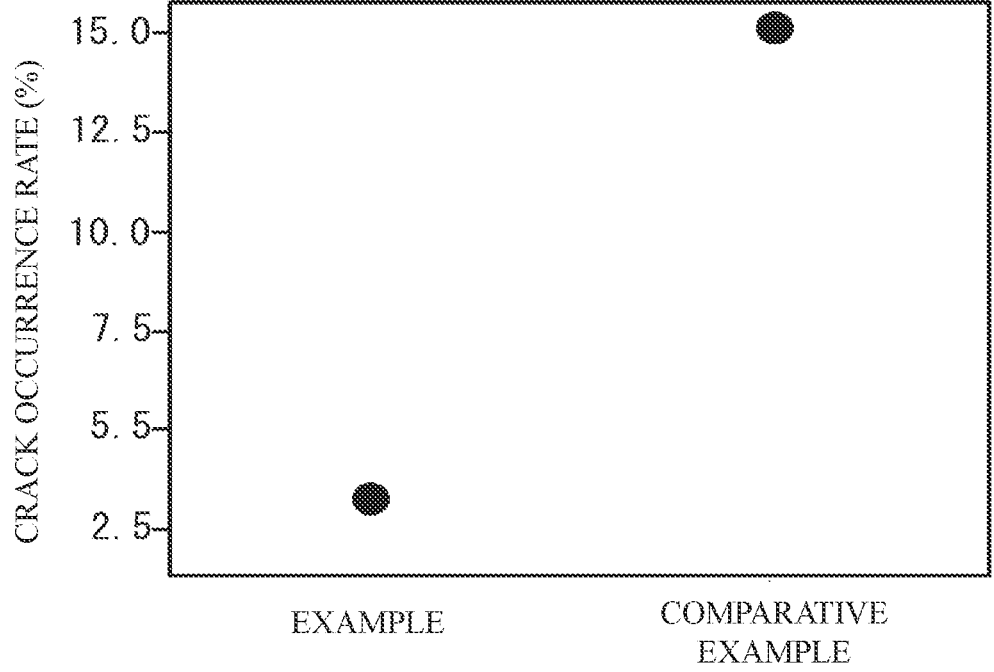
FIG. 18 illustrates a graph indicating crack occurrence rate of an impact test of Example and Comparative Example.

The test results are illustrated in FIG. 18. The crack occurrence rate in Example was approximately 3%. On the other hand, the crack occurrence rate in Comparative Example was approximately 15%. As described above, Example has higher reliability against impact than Comparative Example.

Shock is applied to each test object subjected to the test by vibration. In Comparative Example, the directions of the impact forces input from the first ridgeline portion 124a and a second ridgeline portion 124b are approximately the same. Therefore, it is considered that the impact force is not dispersed but is likely to be propagated in the direction where the capacity section 56 exists (see FIG. 8B). As a result, the crack occurrence rate is considered to be high. On the other hand, in Example, the directions of the impact forces input from the first ridgeline portion 24a and the second ridgeline portion 24b are different. Therefore, it is considered that the impact force is canceled out and the impact force propagated in the direction where the capacity section 16 is present is alleviated (see FIG. 8A). As a result, it is thought that the crack occurrence rate is low.

In this way, it was confirmed that Example had higher reliability against impact than Comparative Example.

Although the above embodiment describes the multilayer ceramic capacitor 10 as an example of a multilayer ceramic electronic component, the present invention is applicable to all multilayer ceramic electronic components in which ceramic layers and internal electrodes are laminated. Examples of such laminated ceramic electronic components include chip varistors, chip thermistors, and laminated inductors.

What is claimed is:

1. A multilayer ceramic electronic device comprising:
a ceramic element body that includes a protection section including an end face directed to a first direction, a plurality of circumferential faces that are adjacent to the end face and extend along the first direction, and a ridge portion having a recess extending along the first direction and connecting the plurality of circumferential faces, and includes an active section located inside the protection section; and
an external electrode including a base film covering the end face and a plated film formed on the base film,
wherein the active section includes a plurality of internal electrodes stacked in a second direction orthogonal to the first direction,
wherein the protection section includes a cover section stacked on the active section along the second direction and a side margin section covering the active section from a third direction orthogonal to the first direction and the second direction,
wherein the ridge portion includes a first ridgeline portion on a side of the cover section and a second ridgeline portion on a side of the side margin section, with the recess between the first ridgeline portion and the second ridgeline portion, and wherein, in a cross section including the second direction and the third direction, a radius of curvature R1 of the first ridgeline portion is larger than a radius of curvature R2 of the second ridgeline portion.

2. The multilayer ceramic electronic device as claimed in claim 1,
wherein a dimension of the multilayer ceramic electronic device in the second direction is larger than a dimension of the multilayer ceramic electronic device in the third direction.

3. The multilayer ceramic electronic device as claimed in claim 1,
wherein the radius of curvature R1 of the first ridgeline portion is 15 μm or more and 25 μm or less.

4. The multilayer ceramic electronic device as claimed in claim 1,
wherein the radius of curvature R2 of the second ridgeline portion is 0 μm or more and 20 μm or less.

5. The multilayer ceramic electronic device as claimed in claim 1,
wherein the base film includes a first covering portion formed on the end face, a plurality of second covering portions formed on the plurality of circumferential faces, and a third covering portion that is formed on the recess and is spaced from at least one of the plurality of second covering portions, and
wherein the plated film continuously covers the first covering portion, the plurality of second covering portions, and the third covering portion.

6. The multilayer ceramic electronic device as claimed in claim 1,
wherein edges of the plurality of internal electrodes in a third direction orthogonal to the first direction and the second direction are aligned within a range of 0.5 μm.

7. A manufacturing method of a multilayer ceramic electronic device, the method comprising:
forming a ceramic multilayer chip that has an end face directed to a first direction, an active section, and a cover section, the active section having a plurality of internal electrodes stacked in a second direction orthogonal to the first direction, the plurality of internal electrodes being exposed to a side face of the ceramic multilayer chip directed to a third direction orthogonal to the first direction and the second direction, the cover section being stacked on the active section along the second direction,
forming a first ridgeline portion adjacent to the end face connecting the circumferential faces extending in the first direction and the side face;
forming a ceramic element body by forming a side margin section that is stacked on the side face, extends along the first direction and has a second ridgeline portion formed with a recess in between;
firing the ceramic multilayer chip and the side margin section; and
forming an external electrode including a base film covering the end face and a plated film formed on the base film,
wherein the forming of the first ridgeline portion includes chamfering in which a radius of curvature R1 of the first ridgeline portion is larger than a radius of curvature R2 of the second ridgeline portion in a cross section including the second direction and the third direction.

8. The method as claimed in claim 7,
wherein, in the forming of the external electrode, a base film including a first covering portion formed on the end face of the ceramic element body, a plurality of second covering portions formed on a plurality of circumferential faces adjacent to the end face and extending in the first direction, and a third covering portion formed on the recess and spaced from at least one of the plurality of the second covering portions is formed, and
wherein the method includes forming a plated film continuously covering the first covering portion, the plurality of second covering portions and the third covering portion.

9. The method as claimed in claim 7,
wherein, in the forming of the side margin section, a first side margin section stacked on the side face and a second side margin section that is stacked on the first side margin section and has a higher thermal shrinkage rate than the first side margin section are formed.

10. The method as claimed in claim 9,
wherein the first side margin section is formed by pasting a first ceramic sheet on the side face, and
wherein the second side margin section is formed by pasting a second ceramic sheet having a higher thermal shrinkage rate than the first ceramic sheet on the first ceramic sheet.

11. A manufacturing method of a multilayer ceramic electronic device, the method comprising:
forming a ceramic element body that has an end face directed to a first direction, an active section, a cover section, a side margin section, circumferential faces extending in the first direction, and a ridge portion connecting the circumferential faces, the active section having a plurality of internal electrodes stacked in a second direction orthogonal to the first direction, the plurality of internal electrodes being exposed to a side face of the ceramic element body directed to a third direction orthogonal to the first direction and the second direction, the cover section being stacked on the active section along the second direction, the side margin being stacked on the side face along the third direction;
firing the ceramic element body;
in the ridge portion, forming a first ridgeline portion that has a radius of curvature R1 in a cross section including the second direction and the third direction, and a second ridgeline portion that is formed with a recess in between and has a radius of curvature R2 in the cross section smaller than the radius of curvature R1; and
forming an external electrode including a base film covering the end face and a plated film formed on the base film.

12. The method as claimed in claim 11, wherein a dimension of the multilayer ceramic electronic device in the second direction is larger than a dimension of the multilayer ceramic electronic device in the third direction.

* * * * *